United States Patent [19]

Bechu et al.

[11] Patent Number: 4,869,178
[45] Date of Patent: Sep. 26, 1989

[54] DEVICE DESIGNED TO ENSURE RUNNING CONTINUITY BETWEEN TWO SUCCESSIVE RAILROAD OR ROAD VEHICLES

[75] Inventors: Jean-Pierre Bechu, Courbevoie; Roland Wanneroy, Paris, both of France

[73] Assignee: Caoutchouc Manufacture et Plastiques, Versailles, France

[21] Appl. No.: 31,602

[22] Filed: Mar. 30, 1987

[30] Foreign Application Priority Data

Mar. 28, 1986 [FR] France .................... 86 04676
Mar. 3, 1987 [FR] France .................... 87 02971

[51] Int. Cl.$^4$ .............................................. B61D 17/20
[52] U.S. Cl. .................................... 105/15; 105/458
[58] Field of Search .................... 105/15, 425, 458; 280/403

[56] References Cited

U.S. PATENT DOCUMENTS

| | | | |
|---|---|---|---|
| 3,399,632 | 9/1968 | Dean | 105/15 |
| 4,507,011 | 3/1985 | Brown | 403/408.1 X |
| 4,539,912 | 9/1985 | Hassel et al. | 105/15 X |
| 4,599,947 | 7/1986 | Keefer | 105/15 |

FOREIGN PATENT DOCUMENTS

| | | |
|---|---|---|
| 0067944 | 1/1983 | European Pat. Off. |
| 0134202 | 3/1985 | European Pat. Off. |
| 0181294 | 5/1986 | European Pat. Off. |
| 966430 | 7/1957 | Fed. Rep. of Germany |
| 1580974 | 3/1971 | Fed. Rep. of Germany |
| 2817739 | 10/1979 | Fed. Rep. of Germany |
| 3035159 | 4/1982 | Fed. Rep. of Germany ...... 280/403 |
| 2357409 | 12/1978 | France |
| 2573714 | 5/1986 | France |
| 1228200 | 4/1971 | United Kingdom |

OTHER PUBLICATIONS

EP 87400636 European Search Report (7-87).

Primary Examiner—Stephen M. Hepperle
Attorney, Agent, or Firm—Antonelli, Terry & Wands

[57] ABSTRACT

A device designed to ensure running continuity between two successive railroad or road vehicles in spite of vertical movements, the lateral sway and the torsion between the floors of said vehicles, characterized in that it includes:

(a) at each end, a deformable joint (10) which ensures tightness against dust, noise and weather,
(b) a self-supporting element (6), which is deformable under torsional stresses, comprised of an elastomer compound (17) reinforced by at least one pair of metal or textile cord plies (16a) and (16b) and resting on two elastic supporting members (7), which are deformable under shear stress, and
(c) angle base (9) mounted onto the floors of vehicles, fitted to said continuous elastic supporting members (7).

9 Claims, 5 Drawing Sheets

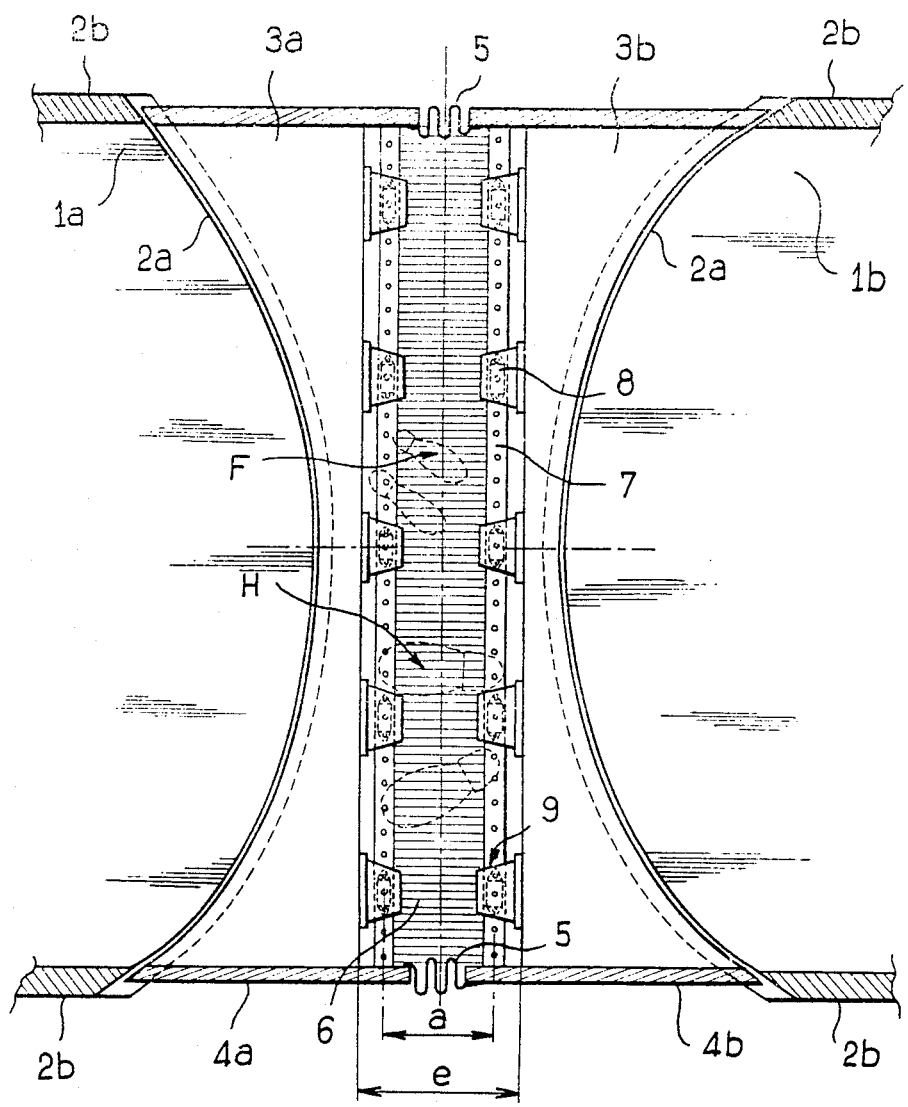
FIG_1

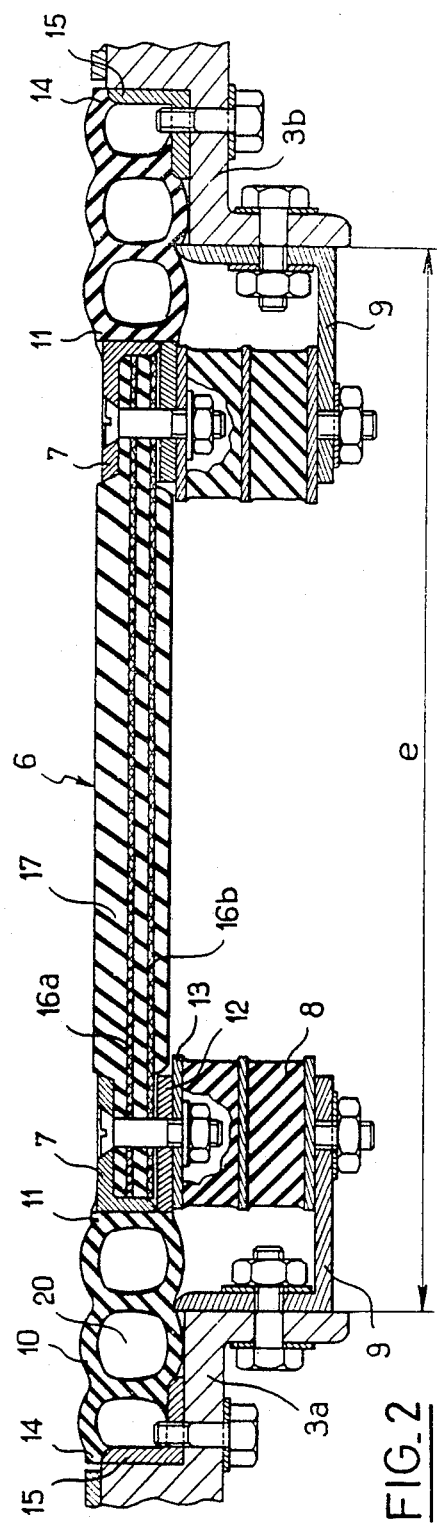
FIG_2
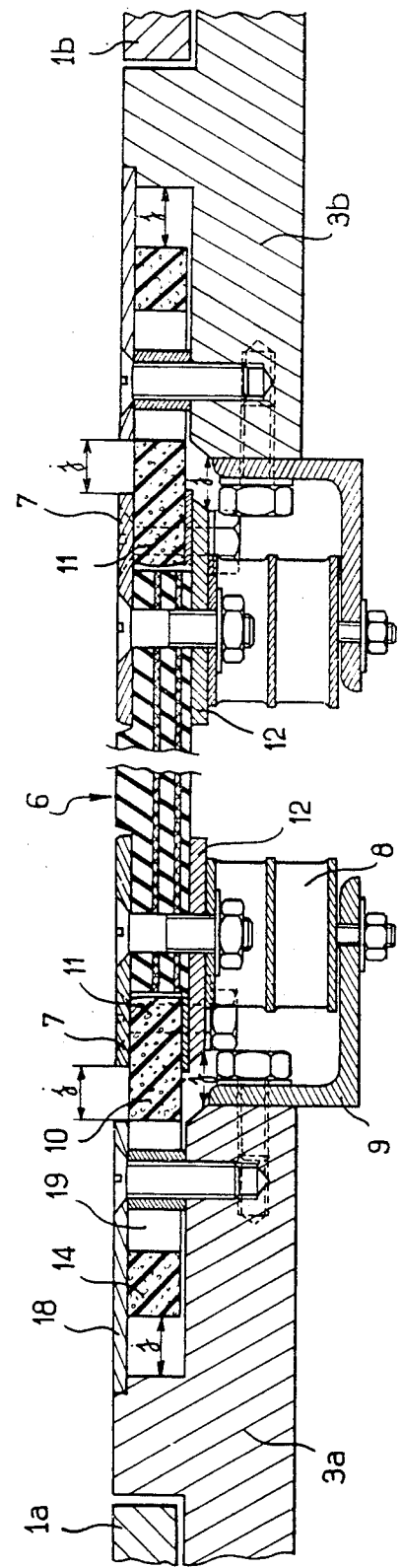
FIG_3

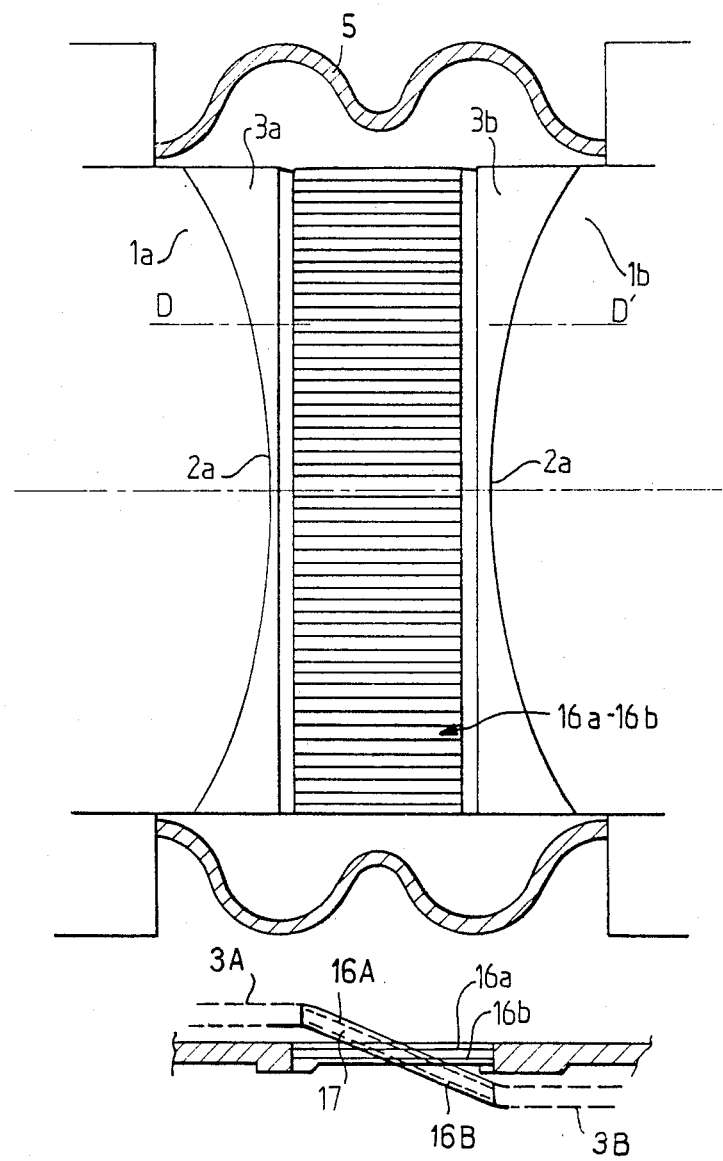

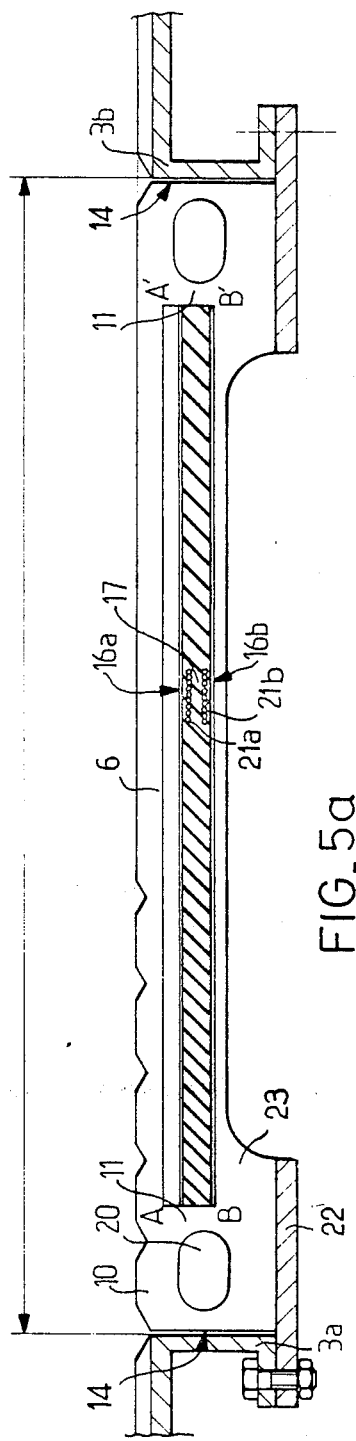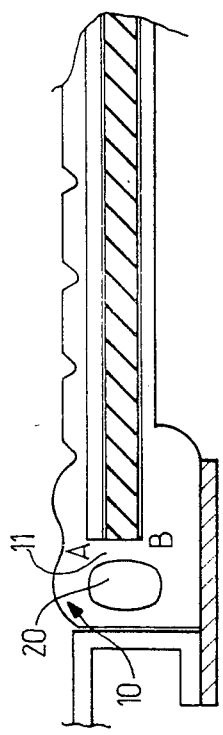

DEVICE DESIGNED TO ENSURE RUNNING CONTINUITY BETWEEN TWO SUCCESSIVE RAILROAD OR ROAD VEHICLES

BACKGROUND OF THE INVENTION

1. Scope of the Invention

The invention pertains to the linkage device between two successive vehicles —railroad or road —where communication is made possible as a result of the use of bellows or platforms that are noise- and weather-proof. It concerns a deformable device, the purpose of which is to allow, by vertical and/or horizontal movements, deformations between the floors of successive vehicles and is more particularly interesting when the number of linked vehicles is greater than two, because many solutions of the prior art do not apply to this configuration.

2. Description of the Prior Art

Usually, linkage between the different vehicle bodies —especially with respect to bramways —is ensured by swiveling around a vertical axis of a kind of intercommunication turret, in which the cylindrical walls, the fairly plane ceiling and the horizontal floor ensure material continuity of the walls, by rotating around an axis that is perpendicular to the floor of each linked vehicle, the swiveling of a floor in relation to that of the interconnecting compartment occurs along two circle arcs that slide one on the other.

Patent FR 2 357 409 describes an interesting embodiment for such kinematics: the two halves of the interconnecting compartment are connected to one another by a horizontal axis, which is located close to the floor, which makes it possible to ensure the material continuity of the floors from one vehicle to the other with a hinge at the horizontal transversal axis which is preferably placed on the load bearing cross-member of a central bogie. The result is a link, of the cardanic type, with three perpendicular axes between the vehicles. The rolling borsion must be absorbed then by the suspensions of the end bogies, if the track is uneven. This device displays the disadvantage of not being applicable, for mechanical reasons, to a train consisting of more than two cars that travel the warped and twisted tracks of urban or mountain railways for instance.

Patent EP 0 134 202 describes another embodiment of the interconnecting compartment when the chassis of the adjacent vehicles have only one common pivot point; the interconnecting compartment which is represented by two halves which each include a semi-circular floor, is oriented by a device which bisects the angle between the two cars. Those two floors of the interconnecting compartment allow for buckling movements between the floors of the adjacent vehicles, even if their number is greater than two, provided that the floors of the interconnecting compartment are connected by an elastically deformable floor, which is not described in the cited document.

In patent EP 0 181 294, of FIAT, the buckling movement of a rigid floor is allowed by a diagonally extending flexible axis. Patent FR 2 573 714 of FAIVELEY recommends a deformable floor, supported by transverse bars which are fixed at their opposite ends by means of articulated parallelograms. Such a floor, which has to endure the enormous deflections —especially those resulting from shearing motions —between vehicles to which it is secured by its ends, must be very flexible and, basically, supported by additional transverse bars which would fill cells, which cells are essential to enable deformation.

Analysis of the prior art apparently reveals the need for a floor in an interconnecting compartment between railroad or road vehicles that can bear loads while being continuous and that can accomodate for misalignements caused by differences in operating levels of the vehicles, buckling motions between the vehicles and small changes in the connecting distance between vehicles. Because of the development of technologies, it would seem also necessary that this type of deformable floor for interconnecting compartment applies to/trains which comprise more than two vehicles.

SUMMARY OF THE INVENTION

The purpose of the invention therefore is to provide such a deformable device, that ensures a continuous connection between the floors of the adjacent vehicles on either side of the interconnecting compartment, which is able to allow vertical and/or horizontal movements regardless of the number of connected vehicles.

The invention consists of a deformable device, which is comprised of parts based on elastomer compounds, said device designed to ensure running continuity between two successive railroad or road vehicles being an element of a train, in spite of differences in operating levels, lateral rolling and/or buckling movements between the floors of said vehicles.

The device subject of the invention includes the following components:

(a) for each end, a deformable joint which ensures tightness against dust, and is weather- and noise-proof, (b) a self-supporting element, deformable by buckling wherein resistance to loads is provided by a spacing between two reinforcement plies embedded in an elastomer compound that rests on two continuous elastic supporting means that are deformable under shear stresses, (c) mounting means onto the vehicle floors, fitted to said continuous elastic supporting means.

Resistance to bending, between the two initially parallel elastic supporting means, of the deformable floor which is the object of the invention is indeed, due to the beam effect of the two reinforcement plies, made of textile or metallic cable, which are kept apart, in the vertical direction, by the elastomer compound that forms the brace, basically able to widstand buckling even significant ones - between the rigid supporting means on the floors of the interconnected half-coaches.

Lengthwise elasticity for small deformations is supplied by the support of such a beam on its two continuous elastic supporting means that are deformable under shear motions while ensuring high stiffness under vertical loads.

BRIEF DESCRIPTION OF THE DRAWINGS

The characteristics and various embodiments of the invention will be understood better upon reading the description accompanying the drawings wherein, FIG. 1 depicts a view from below an overall embodiment of the deformable floor placed between two rigid support lines on discontinuous supports, assembled by mechanical means.

FIG. 2 is a lengthwise section of a cross-section of the embodiment of the deformable floor in conformance with FIG. 1, FIG. 3 illustrates another embodiment of the deformable joint, in the configuration of FIGS. 1 and 2, wherein tightness, ensured by sliding, allows for easy separation between the vehicles, FIG. 4a is a view from above of the embodiment in which the deformable floor is monopiece, highlighting the arrangement of the reinforcement plies, FIG. 4b is a cross-section of the embodiment depicted in FIG. 4a.

FIG. 5a is a complete cross-section of the deformable floor illustrated in FIG. 4a and 4b, said deformable floor being in the free unconstrained state, FIG. 5b is a partial view of same embodiment in a slightly stressed state.

DESCRIPTION OF THE PREFERRED EMBODIMENTS

Figure 6:
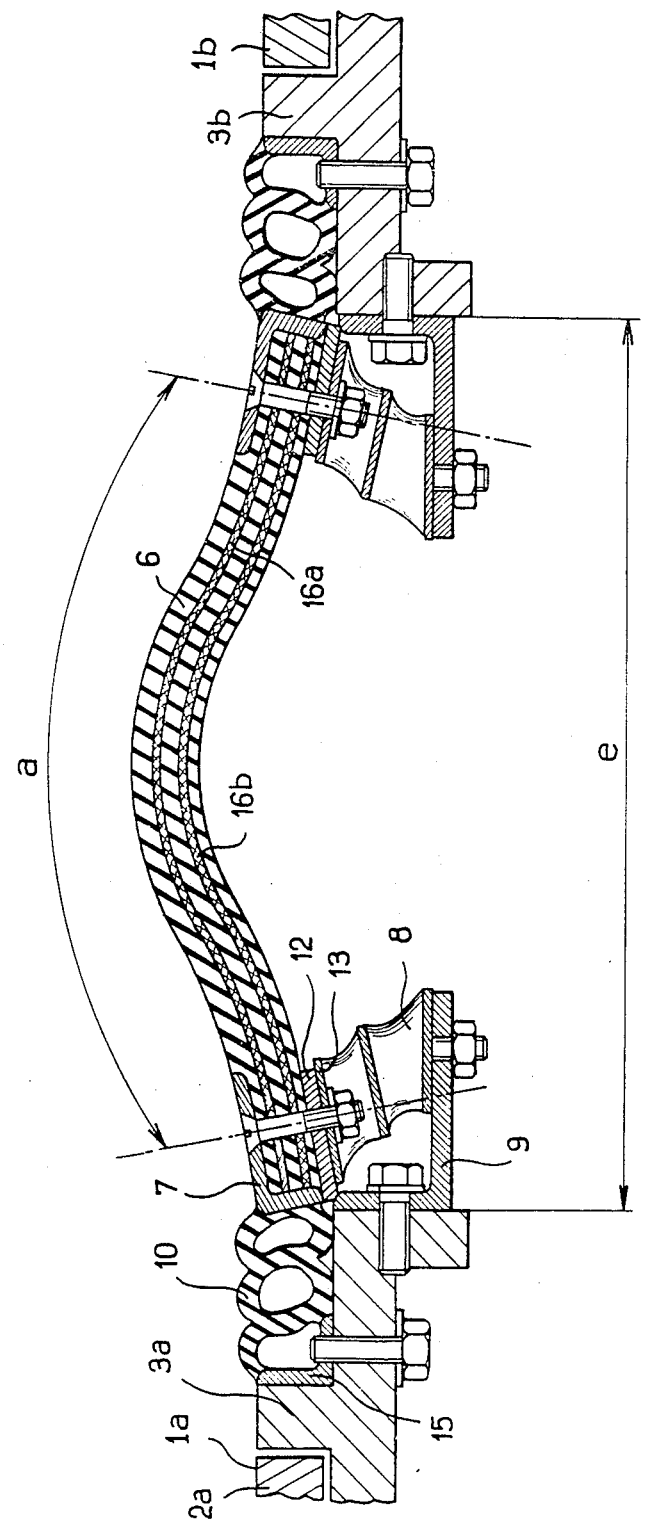
FIG. 6 illustrates the ability of the deformable floor depicted in FIGS. 1 and 2 to buckle in the event of an accidental shock, which triggers the extreme deformation capability of the coupling means between bodies.

FIG. 1 is an overall diagram of the deformable floor, which is executed by mechanical assembly of constituent elements and represented in a view from below.

Between vehicles (1a) and (1b) —of which the ends of the floors (2a) and the side walls (2b) are depicted —the two halves (3a) and (3b) of an interconnecting compartment swivel, each connected to side walls (4a) and (4b) of said interconnecting compartment, said two halves being rendered tight by known means (not depicted) on the one hand with the side walls (2b) of the vehicles (1a) and (1b) and, one the other hand, among themselves by a known deformable wall (5) like a bellows.

The self-supporting element (6) is placed between the rigid floors of interconnecting half-compartments (3a) and (3b). Its width (a), which is usually constant, authorizes the small elastic deflections of the coupling which produce a variation of several millimeters-for instance more or less 15 millimeters, during normal use —the gap (e) of the edges of the floors of the interconnecting half-compartments (3a) and (3b).

To this end, the two edges of the self-supporting element (6) are bolted and clamped by a rigid bar (7), for instance metallic, and they are leaning on elastic bearings (8) —which can be executed with an appropriate assembly, of the sandwich type, made of rubber and metal —depicted, as a non limiting example, in a group of five. Said elastic bearings (8) are designed to display a capability of deformation of about 1 to 2 millimeters, at most, in the vertical direction, so as to bear the loads borne by the floor. They display, in the crosswise and especially the lengthwise orientations of the vehicle, slight stiffness (in other words a reaction which does not exceed 15 daN) that enables the necessary low deflections under shear of the rubber.

The elastic bearings (8) are borne by angle-bars (9) fitted to the inner ends of the floor of the two interconnecting half-compartments (3a) and (3b). Said angle-bars (9) have been depicted as being discontinuous but it is obvious to one skilled in the art that the same function could be filled analogously by continuous angle-bars along the entire crosswise section (such as those illustrated in FIG. 2).

The outlines of the passenger feet, the biggest (H) and the smallest (F), which are depicted in broken line, offer a scale for the device.

FIG. 2 is a section along the lengthwise axis of the vehicles, or more precisely, along the lengthwise axis of the interconnecting compartment even if the two vehicles are no longer aligned which happens when the train travels along 2/part of the curved track of a railway.

This section depicts how air-, noise- and weathertightness can be ensured by a deformable joint (10), made of an additional rubber sealing or made of a profile moulded in several sections which are placed side by side along the entire width of the coach and including cavities (20).

The edge (11) of the deformable joint (10), located beside the deformable floor (6), which has to take its bearing on it will be advantageously bonded to the rigid clamping bar (7) of which the bolting tightens the end —preferably peeled off, i.e. of which the rubber covering has been eliminated up to the vicinity of the reinforcement plies (16a) and (16b) —of the self-supporting element (6).

Anchor-plates (12) are used to grip said deformable floor (6), with a bolting (or riveting) of which some bolts (or rivets) enable also the mounting of upper plates (13) for the elastic bearings (8).

Said elastic bearings (8) will be advantageously —but not compulsorily - designed with a rectangular section, which allows for flexibility in the direction of the gap (e) of the vertical edges of the floors of the interconnecting half-compartments (3a) and (3b) which is greater than flexibility in the perpendicular direction. The motions in the latter direction correspond to parasitic movements between the two interconnecting half-compartments (3a) and (3b), resulting only from friction of the axes provided to swivel on the floors of the vehicles, which was proven experimentally during tests on the first prototypes.

The elastic bearings (8), which are permanently subjected to the small stress that alters the gap (e) of the vertical edges of the floors of the interconnecting half-compartments (3a) and (3b) will be preferentially, made-for their elastic part-, of an elastomer compound of which the formulation, according to the elastomer selection —such as natural rubber, for instance, as a non limiting example —and/or according to the nature of the additives added to the elastomer, will ensure good resistance to dynamic fatigue and therefore greater longevity.

The edges (14) of the deformable joint (10), located beside the vehicles, on either side of the interconnecting compartment are fastened, for instance by bolting a metal insert (15), to the edges of the floors of the interconnecting half-compartments (3a) and (3b).

The loads which apply to the upper side of the deformable joint (10) can be borne by a contact that slides on the angle-bar (9), as depicted, or on the floors of the half-compartments (3a) and (3b), if said floors are thinned in that area. By nature, the element (6), is self-supporting as a result of the bending moment between the rigid supports comprised of the clamping bars (7), at each end, and of the lengthwise stiffness of the two reinforcement plies (16a) and (16b), nearly equal to that of the cords that comprise them, said reinforcement plies (16a) and (16b) being kept apart by their intimate bonding to the elastomer compound which is obtained during the vulcanizing operation.

The reinforcement plies (16a) and (16b) can be comprised of parallel cords, of metal or of high modulus, —i.e. of which the Young's tension modulus is at least equal to 65 GPa —, and, especially, of aromatic polyamide cords, of glass or carbon fibers, of polyethylene fibers or of polypropylene fibers.

The elastomer compound (17) can accommodate advantageously an appropriate formulation which, according to the selection of the elastomer, for example a polymer that includes halogen atoms in its molecular chain —for instance polychloroprene, chlorobutyl or bromobutyl —and/or according to the nature of the additives which are added to the elastomer, will allow it to resist fire and to prevent the release of gas or toxic fumes in the event of contact with a flame.

The deformable joint (10), which ensures the tightness of the device, can be made, for the same safety reasons, of an identical elastomer compound or of one that is different but displaying similar features.

FIG. 3 illustrates an embodiment of the device which is the subject of the invention which displays the advantage of facilitating the uncoupling of the vehicles (1a) and (1b) when the deformable joint - depicted as a non limiting example, made of a cellular material, - connected, for instance, by its edges (11) in contact with the self-supporting element (6), by tightening between the clamping bars (7) and the anchor-plates (12), is in simple support sliding on the floors of the interconnecting half-compartments (3a) and (3b), in a thinned zone.

Then tightness is ensured by covering the edges (14) of the deformable joint (10) with sections (18), made for instance of metal or light alloy, like aluminum, mounted onto the floors of the interconnecting half-compartments (3a) and (3b), through oblong openings (19) set up in the deformable joint (10). When all the mechanical clearance (j), between the deformable joint (10) and the floors of the interconnecting half-compartments (3a) and (3b) as well as between the elastic bearings (8) and the anchor-plates (12) coming into contact with the angle-bars (9) is reduced because of accidental deflection, the self-supporting element (6), because of its design, can be compressed in the shape of a swell.

FIG. 4a displays an embodiment of the deformable floor that connects the edges (2a) of the floors of the vehicles (1a) and (1b), floors on which swivel the half-floors (3a) and (3b) which are elements of an interconnecting compartment.

Weather-tightness is ensured by the membrane (5) that acts as lateral walls.

The two reinforcement plies (16a) and (16b) are placed parallel to the axis of the vehicles, or, when said vehicles are in a curve, parallel to the axis of the solid comprised of the half-floors (3a) and (3b) which swivel around more or less vertical axes. With bogie transoms or auxiliary levers, those geometric rotation axes are not concretized necessarily for each vehicle but they are ensured for instance by curved slides.

FIG. 4b is a section according to DD' of FIG. 4a which makes it possible to diagram the rotation, caused by kinking stemming from the rolling between vehicles, which wharps the vertical plane that contains the geometric rotation axes and, subsequently, the self-supporting element which connects the half-floors (3a) and (3b).

The parts illustrated in continuous lines correspond to the state of operation where the vehicles (1a) and (1b) are aligned, those illustrated in broken lines corresponding to the positions (3A) and (3B) adopted by the half-floors (3a) and (3b) during kinking, said half-floors leading the cords of the reinforcement plies to turn into position (16A) and (16B) by deformation of the elastomer compound (17) in which said plies are embedded.

FIG. 5a is a complete cross-section of the deformable floor illustrated in FIG. 4a and FIG. 4b, in the free unconstrained state.

FIG. 5b is a partial view of same embodiment in a slightly stressed state. FIGS. 5a and 5b highlights how the two reinforcement plies (16a) and (16b), are kept apart by the elastomer compound (17).

The rectangle AA'B'B concretizes a shape that can be produced from the elastomer compound in a "green" state i.e. prior to vulcanizing, from textile or metallic cord plies calendered and superimposed onto successive layers of the elastomer compound (17), these layers possibly alternating with fabrics or plies (21a) and (21b) that ensure cohesion in the crosswise direction. The deformable joint (10), which is depicted here —as a non limiting example —with only one cavity (20) that allows for the small deformations depicted on view 5b, is indeed manufactured during the moulding process of the one-piece device.

The edges (11) of the self-supporting element (6) are placed inside a mould which also contains the angle-bars or simple anchoring plates (22) that were previously subjected to a treatment allowing bonding to the support (23), continuous in the crosswise direction and thus connected to the edge (11) of the self-supporting element (6) up to the wall (14) of the deformable joint (10).

The elastomer compound of the continuous support (23), in intimate bonding with the self-supporting element (6), preconstructed, with a section AA'B'B, can accommodate a formulation that is suited to good resistance to fatigue in order to ensure the taking up of the small dynamic deformations.

The elastomer compound (17) of the self-supporting element (6) can accommodate a formulation that ensures good resistance to fire.

The upper side of the self-supporting element (6) will display advantageously the patterns designed for anti-skid, which are standard for subway floors, for instance, and it will be made of an elastomer compound that resists surface wear as a result of its anti-abrasive properties.

The one-piece device which comprises the deformable floor can be manufactured in series by moulding —without requiring the inconvenience of assembling parts that ensure the various functions —said functions being fulfilled by set zones, i.e.

the continuous support (23), with a constant section, leaning on the angle-bar or mounting plate (22) ensures resistance to dynamic fatigue because of its flexibility under shear stresses during variations in the length (e) between the floors of vehicles, variations which will equal usually more or less 15 millimeters, for instance;

the cavity (20) increases the deformable joint role during stress, by ensuring tightness against noise (when the interconnecting compartment is completely closed inside the membrane (5) as depicted in FIG. 4) but is also weather- and draft-proof, in other instances, as well as maintenance cleaning-proof;

during accidental shocks, the edges (11) and (14) of the deformable joint (10) come into contact, one with the other as a result of the crushing of the cavity (or cavities) (20), and the reinforcement plies (16a) and (16b) thrusting on the elastomer compound of the joint (10) tend to buckle adopting the shape of the Greek letter omega by rotating inside the continuous support (23) around a non concretized horizontal axis;

Crosswise cohesion, which is ensured by the fabrics or plies (21a) and (21b), prevents tearing of the self-supporting element (6) during those shocks.

small crosswise parasitic deformations, resulting from frictions of the intermediate half-floors (3a) and (3b) against the floors of the vehicles where they swivel, are absorbed homogeneously, because of the presence of plies or fabrics (21a) and (21b), by the transverse shear of the continuous support (23), even if the loads, comprised of passengers, their luggage, or the vehicle wheels in car transport shuttles are not distributed crosswise;

the continuity of the lower side of the deformable floor, bonded to the mounting plates (22), without a part protruding from said floor, makes it possible to gain on the overall height to bring closer the level of the deformable floor and the coupling and will be appreciated, especially in the event of use by shuttles enabling the transportation of cars on two levels;

resistance to fire of the elastomer compounds situated at the ceiling is absolutely necessary even if a continuous protective layer must be added to cover the elastomer compound, which has a better resistance to dynamic fatigue which makes up the continuous support (23). As an option, the elastomer compound of that superficial layer will be able to accommodate a formulation suited for the display of an appropriate ceiling color, light or not.

In summary, the embodiment of the deformable floor (illustrated in FIGS. 4 and 5) offers the possibility of industrial manufacturing of a one-piece device which prevents assembly operations for different parts, in order to meet a set of identical functions.

It adds the advantage of reducing the height, thus leading to a slight thickness in the flexible part of the floors of the vehicles, which will be appreciated especially for double-deck coach trains.

FIG. 6 diagrams the behavior of the element (6), illustrated in the embodiment assembled by mechanical means, under accidental shock conditions, which induces the extreme deformations of the coupling means between the vehicles immediately before mechanical deformations occur in the floors (2a) and in the walls (2b) (not shown) of the vehicles (1a) and (1b) which have come into contact.

The self-supporting element (6) is compressed into the shape of the Greek letter omega by deformation of the reinforcement plies (16a) and (16b) which remain parallel among themselves. This omega shaping is harmless and not destructive for the self-supporting element (6). It results into a slight swell of said self-supporting element (6), beneath the feet of the passengers, the travelers being jostled furthermore during the accidental compression of the coupling.

The maximum shear stress of the elastic bearings (8), as well as the coming into contact of their upper plates (13) and the anchor plates (12) with the edges of the floors of the half-compartments (3a) and (3b) or of the angle bars (9) which are fitted to them, first induce a bending torque directed upwards because of the low position of their compressive stresses.

The beam effect between the reinforcement plies (16a) and (16b) postpones the deformation of said self-supporting element (6).

After those parts come into contact, the two reinforcement plies (16a) and (16b) buckle —such buckling taking place in the same direction for both plies —of which the ends come thrusting onto the clamping bars (7), that are bonded to the deformable joint (10) which is itself compressed as much as possible.

The rotation, around a horizontal axis, of the rigid unit comprised of the clamping bars (7), the anchor plates (12) and the upper plates (13) of the elastic bearings (8) is possible through the flexibility of said elastic bearings (8).

This rotation allows under normal use vertical movements of several centimeters between the floors (2a) of the vehicles (1a) and (1b) and, subsequently, between the two floors of the interconnecting half-compartments (3a) and (3b) that follow the deflections of the vehicles but remain aligned on the axis that crosses the two swiveling centers.

An analogous behavior is allegedly observed with the monopiece embodiment of the deformable floor, illustrated in FIGS. 4 and 5, the reducing of the deformation occurring by shear of the continuous support (23), which shear is limited by the coming into contact of the edges (11) and (14) of the deformable joint (10).

Furthermore, in either case, the vertical movements can be different at the right and left edges of the vehicles (1a) and (1b), if the kinetics of the interconnecting half-compartments (3a) and (3b) occurs with a rolling angle between the floors, the structure of the self-supporting element (6) accepting a kinking of the reinforcement plies (16a) and (16b), without substantial strains.

In order to meet the deformation which is depicted in FIG. 6, the components of the reinforcement plies (16a) and (16b) will be selected advantageously among high modulus materials, modulus which differs only slightly from the modulus of the cords and a slight twist, as for a non limiting example, either based on aromatic polyamide cords, polyethylene cords, polypropylene cords, carbon or glass fibers, or slightly stranded metal cables.

APPLICATIONS OF THE INVENTION

The description and the previous figures refer to the case of an interconnecting compartment comprised of two identical halves.

The invention could apply, similarly, to the case of an interconnecting compartment comprised of three elements or more, the median element being for instance supported by a middle point of the coupling between two consecutive vehicles and arranged between two deformable floors manufactured in conformance with the invention.

Similarly, the invention applies in the case of an articulated coach train of which the ends are allegedly supported onto a bogie or a single axle each being common to two adjacent vehicules.

Finally, the invention can be transposed, according to the selection of size and the choice of appropriate reinforcement plies, to interconnecting compartments for vehicles carrying cars or other means of ground transportation.

Furthermore, this device will be of interest in articulated busses or access ramps for airplanes or ships where slight dynamic movements must be allowed.

BENEFITS OF THE INVENTION

The description and the figures highlight the characteristics and benefits of the deformable floor device, object of the invention, and of its various embodiments which:

display a self-supporting floor, said self-supporting effect resulting from the structure which allows for a beam effect between two elastic supporting means;

are noise- and weather-proof due to deformable joint placed at the adjacent ends of the vehicules on either side of the interconnecting compartment;

reduce the vertical movements and torsion between the floors of the successive vehicles as a result of the flexibility of the linkage device to the floor of said vehicles;

allows different vertical movements between the right and left edges of the successive vehicles through the ability of kinking of the reinforcement plies, which allows the use of said deformable floors on trains comprised of a number of vehicles greater than two;

resist accidental shocks, by omega deformation of the reinforcement plies thus inducing only a simple swell of said deformable floor;

can display anti-fire characteristics as a result of the formulation of the elastomer compounds of the self-supporting element and the deformable joint.

display great durability under dynamic stresses under use, as a result of the formulation of the elastomer of the elastic bearings that bear said floor or in continuous elastic supporting means.

One skilled in the art, can obviously assign to the device which is designed to ensure running continuity between two successive railroad or road vehicles, object of the invention, and to its various embodiments illustrated in the figures, various modifications without departing from the scope of the invention.

What is claimed:

1. A device designed to ensure running continuity between two successive railroad or road vehicles in spite of vertical movements, lateral sway and the torsion between the floors of said vehicles, characterized in that it includes:
   (a) at each end, a deformable joint which ensures tightness against dust, noise and weather,
   (b) a self-supporting element which is deformable under torsion stresses, comprised of an elastomer compound reinforced by at least one pair of metal or textile cord plus and resting on two continuous elastic supporting means, which are deformable under shear stresses; and
   (c) mounting means onto the floors of vehicles, fitted to said continuous elastic supporting means.

2. A device which is designed to ensure running continuity between two successive vehicles according to claim 1, characterized in that its components which assume the various functions are assembled by mechanical means, the mounting means onto the floor of vehicles being elastic bearings having a high capability of deformation under shear stresses mainly in the lengthwise direction and secondarily in the crosswise direction of the vehicles, said elastic bearings connecting the continuous elastic supporting means by means of rigid clamping bars and their anchor plates to angle bars.

3. A device which is designed to ensure running continuity between two successive vehicles according to claim 2, characterized in that the elastic bearings are sandwiches made of rubber bonded to metal plates.

4. A device which is designed to ensure running continuity between two successive vehicles according to claim 1, characterized in that the deformable joint includes at least one cavity that is disposed parallel to the continuous elastic supporting means and that is displayed crosswise to the direction of the vehicle, after said device for running continuity has been set up between the two successive vehicles.

5. A device which is designed to ensure running continuity between two successive vehicles according to claim 1, characterized in that the deformable joint is comprised of a cellular material.

6. A device which is designed to ensure running continuity between two successive vehicles according to claim 1, characterized in that the deformable joint and the self-supporting element are made of an elastomer compound designed for a good resistance to fire.

7. A device which is designed to ensure running continuity between two successive vehicles according to claim 1, characterized in that the reinforcement plies of the self-supporting element are comprised of parallel metallic cords, with a slight twist so as to ensure as little deformation as possible under the effect of the load or of moments of bending.

8. A device which is designed to ensure running continuity between two successive vehicles according to claim 1, characterized in that the reinforcement plies of the self-supporting element are comprised of textile cords having a tensile modulus greater than 65 GPa, such as aromatic polyamide fibers, glass fibers, carbon fibers, polyethylene or polypropylene fibers.

9. A device which is designed to ensure running continuity between two successive vehicles according to claim 1 characterized in that its components which assume the various functions are moulded into a one-piece device and mounting plates to the floors of the vehicles are bonded during simultaneous vulcanization to the continuous elastic supporting means.

* * * * *